US010778313B2

(12) United States Patent
Venugopal et al.

(10) Patent No.: US 10,778,313 B2
(45) Date of Patent: Sep. 15, 2020

(54) TECHNIQUES FOR BEAM FAILURE RECOVERY IN WIRELESS COMMUNICATIONS

(71) Applicant: QUALCOMM Incorporated, San Diego, CA (US)

(72) Inventors: Kiran Venugopal, Raritan, NJ (US); Makesh Pravin John Wilson, San Diego, CA (US); Tianyang Bai, Bridgewater, NJ (US); Jung Ho Ryu, Fort Lee, NJ (US); Tao Luo, San Diego, CA (US); Xiaoxia Zhang, San Diego, CA (US)

(73) Assignee: QUALCOMM Incorporated, San Diego, CA (US)

(*) Notice: Subject to any disclaimer, the term of this patent is extended or adjusted under 35 U.S.C. 154(b) by 0 days.

(21) Appl. No.: 16/506,752

(22) Filed: Jul. 9, 2019

(65) Prior Publication Data

US 2020/0059283 A1     Feb. 20, 2020

Related U.S. Application Data

(60) Provisional application No. 62/719,426, filed on Aug. 17, 2018.

(51) Int. Cl.
*H04B 7/06*     (2006.01)
*H04B 7/08*     (2006.01)
*H04W 72/04*    (2009.01)
*H04W 72/06*    (2009.01)

(52) U.S. Cl.
CPC .......... *H04B 7/0632* (2013.01); *H04B 7/088* (2013.01); *H04W 72/046* (2013.01); *H04W 72/0413* (2013.01); *H04W 72/06* (2013.01)

(58) Field of Classification Search
CPC .... H04B 7/0619; H04B 7/063; H04B 7/0632; H04B 7/0868; H04B 7/088; H04W 72/046; H04W 72/06; H04W 72/0413
See application file for complete search history.

(56) References Cited

U.S. PATENT DOCUMENTS

| 9,900,891 | B1* | 2/2018 | Islam | H04B 7/04 |
|---|---|---|---|---|
| 10,349,399 | B2* | 7/2019 | Kishiyama | H04W 72/0406 |
| 10,461,994 | B2* | 10/2019 | Liu | H04L 5/0051 |
| 2018/0102827 | A1 | 4/2018 | Noh et al. | |
| 2019/0261202 | A1* | 8/2019 | Tang | H04B 7/0617 |
| 2019/0350025 | A1* | 11/2019 | Eriksson | H04W 76/15 |

(Continued)

FOREIGN PATENT DOCUMENTS

| WO | 2017196612 A1 | 11/2017 |
|---|---|---|
| WO | 2018082715 A1 | 5/2018 |

OTHER PUBLICATIONS

International Search Report and Written Opinion—PCT/US2019/041240—ISA/EPO—dated Oct. 1, 2019.

*Primary Examiner* — Siu M Lee
(74) *Attorney, Agent, or Firm* — Arent Fox, LLP/Qualcomm Incorporated

(57) ABSTRACT

Aspects described herein relate to indicating, to a base station, to use a separate uplink beam that is different from a downlink beam in transmitting uplink communications, and transmitting uplink communications to the base station based on the separate uplink beam. Additional aspects can relate to performing beam failure detection for the separate uplink and downlink beams.

30 Claims, 8 Drawing Sheets

(56) References Cited

U.S. PATENT DOCUMENTS

| | | |
|---|---|---|
| 2019/0350028 A1 | 11/2019 | Kaasalainen et al. |
| 2019/0394082 A1* | 12/2019 | Cirik .................. H04L 43/16 |
| 2020/0014440 A1* | 1/2020 | Wang ................. H04B 7/061 |
| 2020/0014451 A1* | 1/2020 | Yang ................. H04W 72/046 |

* cited by examiner

TECHNIQUES FOR BEAM FAILURE RECOVERY IN WIRELESS COMMUNICATIONS

CLAIM OF PRIORITY UNDER 35 U.S.C. § 119

The present application for patent claims priority to Provisional Application No. 62/719,426, entitled "TECHNIQUES FOR BEAM FAILURE RECOVERY IN WIRELESS COMMUNICATIONS" filed Aug. 17, 2018, which is assigned to the assignee hereof and hereby expressly incorporated by reference herein for all purposes.

BACKGROUND

Aspects of the present disclosure relate generally to wireless communication systems, and more particularly, to transmitting/receiving beams and/or recovering from beam failure.

Wireless communication systems are widely deployed to provide various types of communication content such as voice, video, packet data, messaging, broadcast, and so on. These systems may be multiple-access systems capable of supporting communication with multiple users by sharing the available system resources (e.g., time, frequency, and power). Examples of such multiple-access systems include code-division multiple access (CDMA) systems, time-division multiple access (TDMA) systems, frequency-division multiple access (FDMA) systems, and orthogonal frequency-division multiple access (OFDMA) systems, and single-carrier frequency division multiple access (SC-FDMA) systems.

These multiple access technologies have been adopted in various telecommunication standards to provide a common protocol that enables different wireless devices to communicate on a municipal, national, regional, and even global level. For example, a fifth generation (5G) wireless communications technology (which can be referred to as 5G new radio (5G NR)) is envisaged to expand and support diverse usage scenarios and applications with respect to current mobile network generations. In an aspect, 5G communications technology can include: enhanced mobile broadband addressing human-centric use cases for access to multimedia content, services and data; ultra-reliable-low latency communications (URLLC) with certain specifications for latency and reliability; and massive machine type communications, which can allow a very large number of connected devices and transmission of a relatively low volume of non-delay-sensitive information. As the demand for mobile broadband access continues to increase, however, further improvements in 5G communications technology and beyond may be desired.

In some wireless communication technologies, such as 5G, beamformed signals (also referred to as "beams") can be transmitted by a transmitting node for receipt by a receiving node. The receiving node can select a received beam that is determined to be desirable (e.g., that exhibits higher received strength or quality than one or more of the other beams) and can notify the transmitting node of the selection. The transmitting node, in turn, can beamform, based on the selected beam, subsequent signals for receipt by the receiving node. In addition, based on a reciprocal theory, the receiving node can similarly beamform signals to transmit to the transmitting node using the same (or reversed) beam. Specifically, in gNB to user equipment (UE) communications, the same downlink beam (transmitted from gNB to UE) and uplink beam (transmitted from UE to gNB) can be used.

SUMMARY

The following presents a simplified summary of one or more aspects in order to provide a basic understanding of such aspects. This summary is not an extensive overview of all contemplated aspects, and is intended to neither identify key or critical elements of all aspects nor delineate the scope of any or all aspects. Its sole purpose is to present some concepts of one or more aspects in a simplified form as a prelude to the more detailed description that is presented later.

According to an example, a method for wireless communications is provided. The method includes indicating, to a base station, to use a separate uplink beam that is different from a downlink beam in transmitting uplink communications, and transmitting uplink communications to the base station based on the separate uplink beam.

In another example, a method for wireless communications is provided. The method includes receiving, from a user equipment (UE), an indication to use a separate uplink beam that is different from a downlink beam for transmitting uplink communications, and receiving, from the UE, uplink communications based on the separate uplink beam.

In another example, a method for wireless communications is provided. The method includes establishing one or more beams for communicating with a base station, receiving, from the base station, an indication to determine a beam failure detection threshold, determining the beam failure detection threshold based on one or more parameters, and monitoring, based on the beam failure detection threshold, one or more reference signals associated with the one or more beams to detect beam failure.

In another example, a method for wireless communications is provided. The method includes establishing one or more beams for communicating with a UE, transmitting, to the UE, an indication to determine a beam failure detection threshold, and receiving, from the UE and based on the beam failure detection threshold, an indication of beam failure.

In a further aspect, an apparatus for wireless communication is provided that includes a transceiver, a memory configured to store instructions, and one or more processors communicatively coupled with the transceiver and the memory. The one or more processors are configured to execute the instructions to perform the operations of methods described herein. In another aspect, an apparatus for wireless communication is provided that includes means for performing the operations of methods described herein. In yet another aspect, a computer-readable medium is provided including code executable by one or more processors to perform the operations of methods described herein.

For example, an apparatus for wireless communication is provided that includes a transceiver, a memory configured to store instructions, and one or more processors communicatively coupled with the transceiver and the memory, where the one or more processors are configured to indicate, to a base station, to use a separate uplink beam that is different from a downlink beam in transmitting uplink communications, and transmit uplink communications to the base station based on the separate uplink beam.

In another example, an apparatus for wireless communication is provided that includes means for indicating, to a base station, to use a separate uplink beam that is different from a downlink beam in transmitting uplink communications, and means for transmitting uplink communications to the base station based on the separate uplink beam.

In yet another example, a computer-readable medium including code executable by one or more processors for wireless communications is included where the code includes code for indicating, to a base station, to use a separate uplink beam that is different from a downlink beam in transmitting uplink communications, and transmitting uplink communications to the base station based on the separate uplink beam.

To the accomplishment of the foregoing and related ends, the one or more aspects comprise the features hereinafter fully described and particularly pointed out in the claims. The following description and the annexed drawings set forth in detail certain illustrative features of the one or more aspects. These features are indicative, however, of but a few of the various ways in which the principles of various aspects may be employed, and this description is intended to include all such aspects and their equivalents.

BRIEF DESCRIPTION OF THE DRAWINGS

The disclosed aspects will hereinafter be described in conjunction with the appended drawings, provided to illustrate and not to limit the disclosed aspects, wherein like designations denote like elements, and in which.

DETAILED DESCRIPTION

Figure 1:
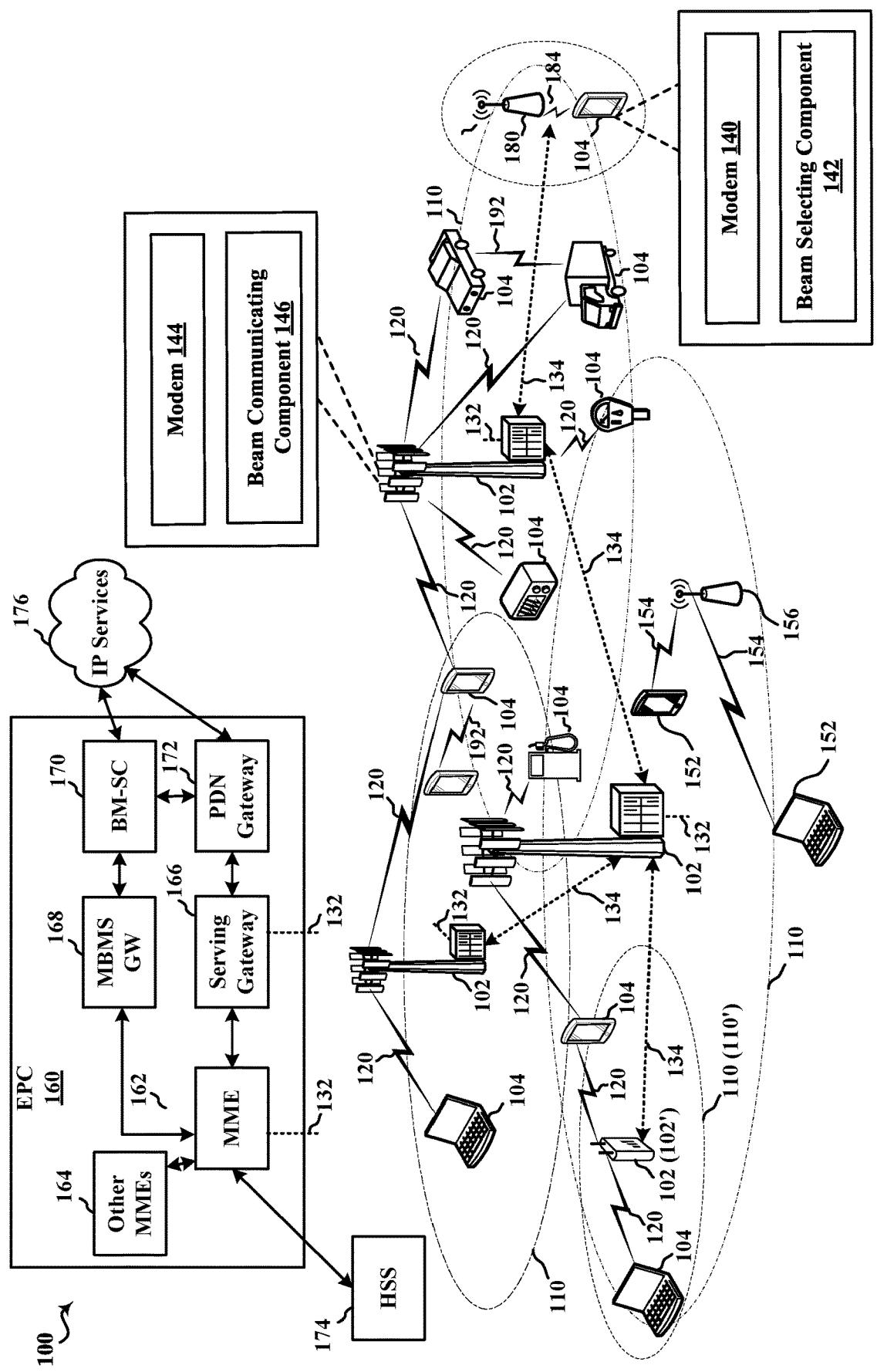
FIG. 1 illustrates an example of a wireless communication system, in accordance with various aspects of the present disclosure.

Various aspects are now described with reference to the drawings. In the following description, for purposes of explanation, numerous specific details are set forth in order to provide a thorough understanding of one or more aspects. It may be evident, however, that such aspect(s) may be practiced without these specific details.

The described features generally relate to decoupling downlink and uplink beams in wireless communications. For example, in fifth generation (5G) new radio (NR) communications, beams can be transmitted between nodes to allow a receiving node to select a desirable beam, and the selected beam can be used by both nodes in transmitting communications to one another. Radio conditions, however, may not always be the same at the gNB and UE, and thus the reciprocal theory of beamforming may not always allow for selecting a desirable beam for communications. In this regard, decoupling the beams may allow for using different beams for transmitting from a first node to a second node and for transmitting from the second node to the first node. Though generally described herein as a downlink (DL) beam (e.g., a gNB transmit beam and user equipment (UE) receive beam) and an uplink (UL) beam (e.g., a UE transmit beam and gNB receive beam), the decoupled beams described herein can be configured to exist between any two types of nodes on substantially any type of link.

In an example, the downlink and uplink beams can be decoupled, which can mitigate possible effects of maximum permissible exposure (MPE) limitations in millimeter wave (mmWave) systems, such as 5G NR. In an example, the UE can report not only a preferred beam (e.g., previously used for downlink and uplink beams) but can also indicate a preferred UL beam. For example, in addition to providing a signal strength report of a number of beams, the UE can indicate which of the beams are candidates for UL beams. In some examples, however, decoupling the beams may also result in modification of beam failure detection and/or recovery. For example, beam failure for DL and UL beams can be separately detected, reported, and/or recovered. In examples described herein, the UE and/or the gNB can detect failure of the UL beam and can trigger recovery.

The described features will be presented in more detail below with reference to FIGS. 1-8.

As used in this application, the terms "component," "module," "system" and the like are intended to include a computer-related entity, such as but not limited to hardware, firmware, a combination of hardware and software, software, or software in execution. For example, a component may be, but is not limited to being, a process running on a processor, a processor, an object, an executable, a thread of execution, a program, and/or a computer. By way of illustration, both an application running on a computing device and the computing device can be a component. One or more components can reside within a process and/or thread of execution and a component can be localized on one computer and/or distributed between two or more computers. In addition, these components can execute from various computer readable media having various data structures stored thereon. The components can communicate by way of local and/or remote processes such as in accordance with a signal having one or more data packets, such as data from one component interacting with another component in a local system, distributed system, and/or across a network such as the Internet with other systems by way of the signal.

Techniques described herein may be used for various wireless communication systems such as CDMA, TDMA, FDMA, OFDMA, SC-FDMA, and other systems. The terms "system" and "network" may often be used interchangeably. A CDMA system may implement a radio technology such as CDMA2000, Universal Terrestrial Radio Access (UTRA), etc. CDMA2000 covers IS-2000, IS-95, and IS-856 standards. IS-2000 Releases 0 and A are commonly referred to as CDMA2000 1x, 1x, etc. IS-856 (TIA-856) is commonly referred to as CDMA2000 1xEV-DO, High Rate Packet Data (HRPD), etc. UTRA includes Wideband CDMA (WCDMA) and other variants of CDMA. A TDMA system may implement a radio technology such as Global System for Mobile Communications (GSM). An OFDMA system may implement a radio technology such as Ultra Mobile Broadband (UMB), Evolved UTRA (E-UTRA), IEEE 802.11 (Wi-Fi), IEEE 802.16 (WiMAX), IEEE 802.20, Flash-OFDM™, etc. UTRA and E-UTRA are part of Universal Mobile Telecommunication System (UMTS). 3GPP Long Term Evolution (LTE) and LTE-Advanced (LTE-A) are new releases of UMTS that use E-UTRA. UTRA, E-UTRA, UMTS, LTE, LTE-A, and GSM are described in documents from an organization named "3rd Generation Partnership Project" (3GPP). CDMA2000 and UMB are described in documents from an organization named "3rd Generation Partnership Project 2" (3GPP2). The techniques described herein may be used for the systems and radio technologies mentioned above as well as other systems and radio technologies, including cellular (e.g., LTE) communications over a shared radio frequency spectrum band. The description below, however, describes an LTE/LTE-A system for purposes of example, and LTE terminology is used in much of the description below, although the techniques are applicable beyond LTE/LTE-A applications (e.g., to fifth generation (5G) new radio (NR) networks or other next generation communication systems).

The following description provides examples, and is not limiting of the scope, applicability, or examples set forth in the claims. Changes may be made in the function and arrangement of elements discussed without departing from the scope of the disclosure. Various examples may omit, substitute, or add various procedures or components as appropriate. For instance, the methods described may be performed in an order different from that described, and various steps may be added, omitted, or combined. Also, features described with respect to some examples may be combined in other examples.

Various aspects or features will be presented in terms of systems that can include a number of devices, components, modules, and the like. It is to be understood and appreciated that the various systems can include additional devices, components, modules, etc. and/or may not include all of the devices, components, modules etc. discussed in connection with the figures. A combination of these approaches can also be used.

Referring to FIG. 1, in accordance with various aspects described herein, an example of a wireless communication access network 100 includes at least one UE 104 with a modem 140 for communicating in a wireless network and a beam selecting component 142 for selecting one or more desirable DL and/or UL beams for communicating with a base station 102, as described above and further herein. Further, wireless communication access network 100, also referred to as a wireless wide area network (WWAN), includes at least one base station 102 via which the UE 104 can communicate with one or more nodes of the wireless communication access network to communicate data corresponding to the service. The base station 102 can include a millimeter wave (mmW) base station 180, such as a gNB, which can also have a modem 144 for communicating in the wireless network and a beam communicating component 146 for configuring and/or communicating with the UE 104 using one or more of the selected DL and/or UL beams.

The one or more UEs 104 and/or the one or more base stations 102 may communicate with other UEs and/or other base stations via an Evolved Packet Core (EPC) 160 or a 5G core. The base stations 102 (which can be collectively referred to as Evolved Universal Mobile Telecommunications System (UMTS) Terrestrial Radio Access Network (E-UTRAN)) may interface with the EPC 160 through backhaul links 132 (e.g., S1 interface). In addition to other functions, the base stations 102 may perform one or more of the following functions: transfer of user data, radio channel ciphering and deciphering, integrity protection, header compression, mobility control functions (e.g., handover, dual connectivity), inter-cell interference coordination, connection setup and release, load balancing, distribution for non-access stratum (NAS) messages, NAS node selection, synchronization, radio access network (RAN) sharing, multimedia broadcast multicast service (MBMS), subscriber and equipment trace, RAN information management (RIM), paging, positioning, and delivery of warning messages. The base stations 102 may communicate directly or indirectly (e.g., through the EPC 160) with each other over backhaul links 134 (e.g., X2 interface). The backhaul links 134 may be wired or wireless.

The base stations 102 may wirelessly communicate with the UEs 104. Each of the base stations 102 may provide communication coverage for a respective geographic coverage area 110. There may be overlapping geographic coverage areas 110. For example, the small cell 102' may have a coverage area 110' that overlaps the coverage area 110 of one or more macro base stations 102. A network that includes both small cell and macro cells may be known as a heterogeneous network. A heterogeneous network may also include Home Evolved Node Bs (eNBs) (HeNBs), which may provide service to a restricted group known as a closed subscriber group (CSG). The communication links 120 between the base stations 102 and the UEs 104 may include uplink (UL) (also referred to as reverse link) transmissions from a UE 104 to a base station 102 and/or downlink (DL) (also referred to as forward link) transmissions from a base station 102 to a UE 104. The communication links 120 may use multiple-input and multiple-output (MIMO) antenna technology, including spatial multiplexing, beamforming, and/or transmit diversity. The communication links may be through one or more carriers. The base stations 102/UEs 104 may use spectrum up to Y MHz (e.g., 5, 10, 15, 20, 100 MHz) bandwidth per carrier allocated in a carrier aggregation of up to a total of Y*x MHz (where x can be a number of component carriers) used for transmission in each direction. The carriers may or may not be adjacent to or contiguous with each other. Allocation of carriers may be asymmetric with respect to DL and UL (e.g., more or less carriers may be allocated for DL than for UL). The component carriers may include a primary component carrier and one or more secondary component carriers. A primary component carrier may be referred to as a primary cell (PCell) and a secondary component carrier may be referred to as a secondary cell (SCell).

Certain UEs 104 may communicate with each other using device-to-device (D2D) communication link 192. The D2D communication link 192 may use the DL/UL WWAN spectrum. The D2D communication link 192 may use one or more sidelink channels, such as a physical sidelink broadcast channel (PSBCH), a physical sidelink discovery channel (PSDCH), a physical sidelink shared channel (PSSCH), and a physical sidelink control channel (PSCCH). D2D communication may be through a variety of wireless D2D communications systems, such as for example, FlashLinQ, WiMedia, Bluetooth, ZigBee, Wi-Fi based on the IEEE 802.11 standard, LTE, or NR.

The wireless communications system may further include a Wi-Fi access point (AP) 156 in communication with Wi-Fi stations (STAs) 152 via communication links 154 in a 5 GHz unlicensed frequency spectrum. When communicating in an unlicensed frequency spectrum, the STAs 152/AP 156 may perform a clear channel assessment (CCA) prior to communicating in order to determine whether the channel is available. In one example, aspects described herein in the context of a base station 102 may be employed, where appropriate, by an AP 156. Similarly, for example, aspects described herein in the context of a UE 104 may be employed, where appropriate, by a STA 152.

The small cell 102' may operate in a licensed and/or an unlicensed frequency spectrum. When operating in an unlicensed frequency spectrum, the small cell 102' may employ NR and use the same 5 GHz unlicensed frequency spectrum as used by the Wi-Fi AP 156. The small cell 102', employing NR in an unlicensed frequency spectrum, may boost coverage to and/or increase capacity of the access network.

The gNodeB (gNB) 180 may operate in millimeter wave (mmW) frequencies and/or near mmW frequencies in communication with the UE 104. When the gNB 180 operates in mmW or near mmW frequencies, the gNB 180 may be referred to as a mmW base station. Extremely high frequency (EHF) is part of the RF in the electromagnetic spectrum. EHF has a range of 30 GHz to 300 GHz and a wavelength between 1 millimeter and 10 millimeters. Radio waves in the band may be referred to as a millimeter wave. Near mmW may extend down to a frequency of 3 GHz with a wavelength of 100 millimeters. The super high frequency (SHF) band extends between 3 GHz and 30 GHz, also referred to as centimeter wave. Communications using the mmW/near mmW radio frequency band has extremely high path loss and a short range. The mmW base station 180 may utilize beamforming 184 with the UE 104 to compensate for the extremely high path loss and short range.

The EPC 160 may include a Mobility Management Entity (MME) 162, other MMES 164, a Serving Gateway 166, a Multimedia Broadcast Multicast Service (MBMS) Gateway 168, a Broadcast Multicast Service Center (BM-SC) 170, and a Packet Data Network (PDN) Gateway 172. The MME 162 may be in communication with a Home Subscriber Server (HSS) 174. The MME 162 can be a control node that processes signaling between the UEs 104 and the EPC 160. Generally, the MME 162 can provide bearer and connection management. User Internet protocol (IP) packets (e.g., of or relating to the UE 104) can be transferred through the Serving Gateway 166, which itself is connected to the PDN Gateway 172. The PDN Gateway 172 can provide UE IP address allocation as well as other functions. The PDN Gateway 172 and the BM-SC 170 can be connected to the IP Services 176. The IP Services 176 may include the Internet, an intranet, an IP Multimedia Subsystem (IMS), a PS Streaming Service, and/or other IP services. The BM-SC 170 may provide functions for MBMS user service provisioning and delivery. The BM-SC 170 may serve as an entry point for content provider MBMS transmission, may be used to authorize and initiate MBMS Bearer Services within a public land mobile network (PLMN), and may be used to schedule MBMS transmissions. The MBMS Gateway 168 may be used to distribute MBMS traffic to the base stations 102 belonging to a Multicast Broadcast Single Frequency Network (MBSFN) area broadcasting a particular service, and may be responsible for session management (start/stop) and for collecting eMBMS related charging information. In other examples, a 5G core may include other components or functions that may be accessible by the base station 102 over a backhaul link in a 5G wireless network, such as a Access and Mobility Management Function (AMF) a Session Management Function (SMF), a User Plane Function (UPF), a Unified Data Management (UDM), etc.

The base station may also be referred to as a gNB, Node B, evolved Node B (eNB), an access point, a base transceiver station, a radio base station, a radio transceiver, a transceiver function, a basic service set (BSS), an extended service set (ESS), or some other suitable terminology. The base station 102 provides an access point to the EPC 160 for one or more UEs 104. Examples of UEs 104 include factory equipment or nodes, as described above, a cellular phone, a smart phone, a session initiation protocol (SIP) phone, a laptop, a personal digital assistant (PDA), a satellite radio, a global positioning system, a multimedia device, a video device, a digital audio player (e.g., MP3 player), a camera, a game console, a tablet, a smart device, a wearable device, a vehicle, an electric meter, a gas pump, a large or small kitchen appliance, a healthcare device, an implant, a display, or any other similar functioning device. Some of the UEs 104 may be referred to as IoT devices (e.g., parking meter, gas pump, toaster, vehicles, heart monitor, etc.). The UE 104 may also be referred to as a station, a mobile station, a subscriber station, a mobile unit, a subscriber unit, a wireless unit, a remote unit, a mobile device, a wireless device, a wireless communications device, a remote device, a mobile subscriber station, an access terminal, a mobile terminal, a wireless terminal, a remote terminal, a handset, a user agent, a mobile client, a client, or some other suitable terminology.

In an example, a base station 102 (e.g., a gNB 180 or other base station 102) and/or UEs 104 can be capable of beamforming signals in communicating with one another. Beamforming can be applied using an antenna array at the base station 102 and/or UEs 104 to apply a directionality to a signal. This can be accomplished via a beamforming matrix that can define signal properties for signals to be transmitted by the antenna array to achieve the directionality. As described, base station 102 can transmit reference signals, which a UE 104 can receive and report strength and/or quality metrics of desirable reference signals to the base station 102. The base station 102 can accordingly determine a beam associated with the reference signal, and can apply the beam in communicating with the UE 104. In examples described herein, the UE 104 can provide an indication of desirable beams and separately desirable UL beams to decouple DL and UL beams. In addition, the UE 104 and/or base station 102 can separately detect at least partial beam failure of the DL and UL beams.

Turning now to FIGS. 2-8, aspects are depicted with reference to one or more components and one or more methods that may perform the actions or operations described herein, where aspects in dashed line may be optional. Although the operations described below in FIGS. 4-7 are presented in a particular order and/or as being performed by an example component, it should be understood that the ordering of the actions and the components performing the actions may be varied, depending on the implementation. Moreover, it should be understood that the following actions, functions, and/or described components may be performed by a specially-programmed processor, a processor executing specially-programmed software or computer-readable media, or by any other combination of a hardware component and/or a software component capable of performing the described actions or functions.

Figure 2:
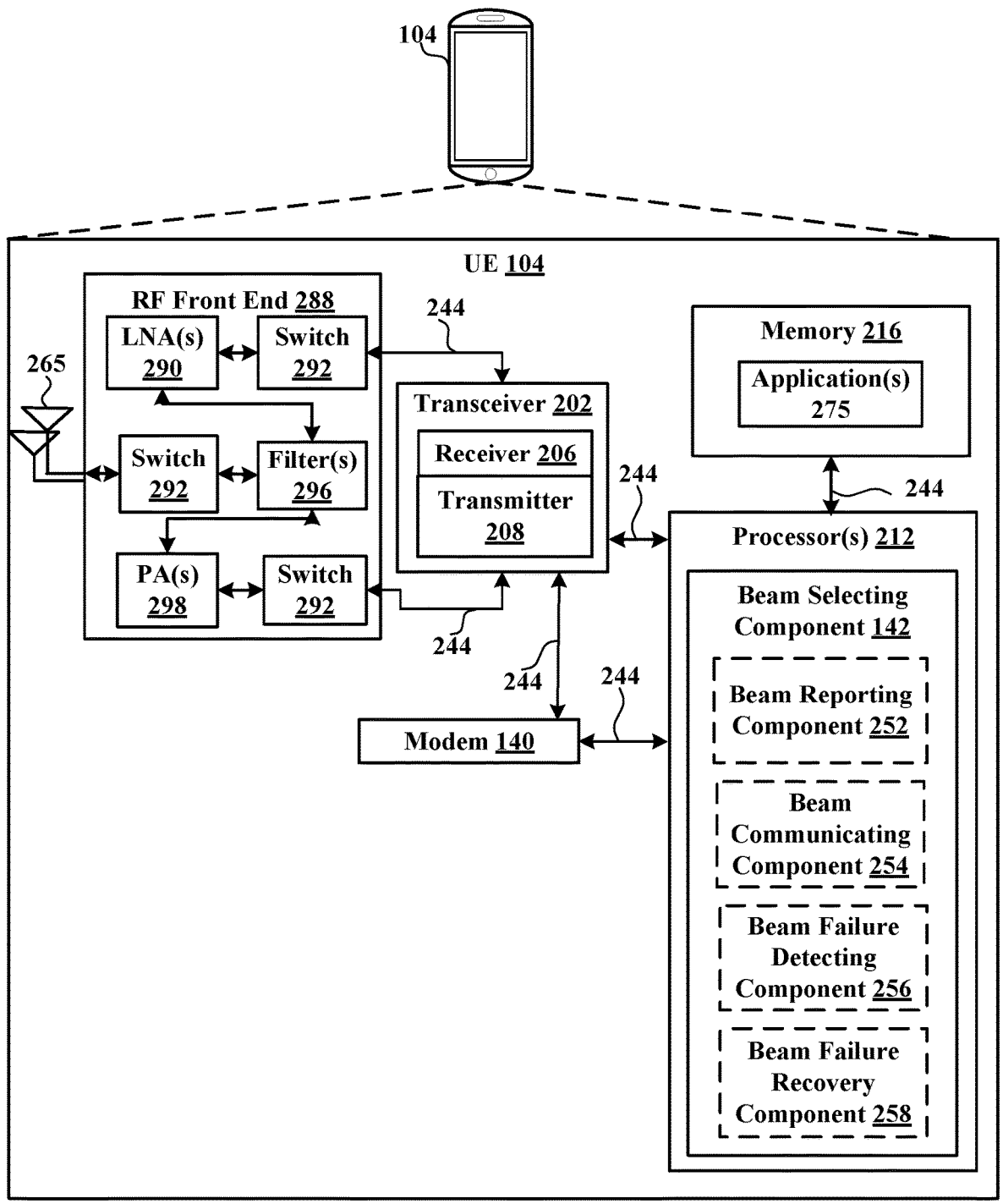
FIG. 2 is a block diagram illustrating an example of a UE, in accordance with various aspects of the present disclosure.

Referring to FIG. 2, one example of an implementation of UE 104 may include a variety of components, some of which have already been described above and are described further herein, including components such as one or more processors 212 and memory 216 and transceiver 202 in communication via one or more buses 244, which may operate in conjunction with modem 140 and/or beam selecting component 142 to enable one or more of the functions described herein related to indicating desirable beams and/or separately indicating desirable UL beams to use in communicating with one or more base stations 102.

In an aspect, the one or more processors 212 can include a modem 140 and/or can be part of the modem 140 that uses one or more modem processors. Thus, the various functions related to beam selecting component 142 may be included in modem 140 and/or processors 212 and, in an aspect, can be executed by a single processor, while in other aspects, different ones of the functions may be executed by a combination of two or more different processors. For example, in an aspect, the one or more processors 212 may include any one or any combination of a modem processor, or a baseband processor, or a digital signal processor, or a transmit processor, or a receiver processor, or a transceiver processor associated with transceiver 202. In other aspects, some of the features of the one or more processors 212 and/or modem 140 associated with beam selecting component 142 may be performed by transceiver 202.

Also, memory 216 may be configured to store data used herein and/or local versions of applications 275 or beam selecting component 142 and/or one or more of its subcomponents being executed by at least one processor 212. Memory 216 can include any type of computer-readable medium usable by a computer or at least one processor 212, such as random access memory (RAM), read only memory (ROM), tapes, magnetic discs, optical discs, volatile memory, non-volatile memory, and any combination thereof. In an aspect, for example, memory 216 may be a non-transitory computer-readable storage medium that stores one or more computer-executable codes defining beam selecting component 142 and/or one or more of its subcomponents, and/or data associated therewith, when UE 104 is operating at least one processor 212 to execute beam selecting component 142 and/or one or more of its subcomponents.

Transceiver 202 may include at least one receiver 206 and at least one transmitter 208. Receiver 206 may include hardware, firmware, and/or software code executable by a processor for receiving data, the code comprising instructions and being stored in a memory (e.g., computer-readable medium). Receiver 206 may be, for example, a radio frequency (RF) receiver. In an aspect, receiver 206 may receive signals transmitted by at least one base station 102. Additionally, receiver 206 may process such received signals, and also may obtain measurements of the signals, such as, but not limited to, Ec/Io, SNR, RSRP, RSSI, etc. Transmitter 208 may include hardware, firmware, and/or software code executable by a processor for transmitting data, the code comprising instructions and being stored in a memory (e.g., computer-readable medium). A suitable example of transmitter 208 may including, but is not limited to, an RF transmitter.

Moreover, in an aspect, UE 104 may include RF front end 288, which may operate in communication with one or more antennas 265 and transceiver 202 for receiving and transmitting radio transmissions, for example, wireless communications transmitted by at least one base station 102 or wireless transmissions transmitted by UE 104. RF front end 288 may be connected to one or more antennas 265 and can include one or more low-noise amplifiers (LNAs) 290, one or more switches 292, one or more power amplifiers (PAs) 298, and one or more filters 296 for transmitting and receiving RF signals.

In an aspect, LNA 290 can amplify a received signal at a desired output level. In an aspect, each LNA 290 may have a specified minimum and maximum gain values. In an aspect, RF front end 288 may use one or more switches 292 to select a particular LNA 290 and its specified gain value based on a desired gain value for a particular application.

Further, for example, one or more PA(s) 298 may be used by RF front end 288 to amplify a signal for an RF output at a desired output power level. In an aspect, each PA 298 may have specified minimum and maximum gain values. In an aspect, RF front end 288 may use one or more switches 292 to select a particular PA 298 and its specified gain value based on a desired gain value for a particular application.

Also, for example, one or more filters 296 can be used by RF front end 288 to filter a received signal to obtain an input RF signal. Similarly, in an aspect, for example, a respective filter 296 can be used to filter an output from a respective PA 298 to produce an output signal for transmission. In an aspect, each filter 296 can be connected to a specific LNA 290 and/or PA 298. In an aspect, RF front end 288 can use one or more switches 292 to select a transmit or receive path using a specified filter 296, LNA 290, and/or PA 298, based on a configuration as specified by transceiver 202 and/or processor 212.

As such, transceiver 202 may be configured to transmit and receive wireless signals through one or more antennas 265 via RF front end 288. In an aspect, transceiver may be tuned to operate at specified frequencies such that UE 104 can communicate with, for example, one or more base stations 102 or one or more cells associated with one or more base stations 102. In an aspect, for example, modem 140 can configure transceiver 202 to operate at a specified frequency and power level based on the UE configuration of the UE 104 and the communication protocol used by modem 140.

In an aspect, modem 140 can be a multiband-multimode modem, which can process digital data and communicate with transceiver 202 such that the digital data is sent and received using transceiver 202. In an aspect, modem 140 can be multiband and be configured to support multiple frequency bands for a specific communications protocol. In an aspect, modem 140 can be multimode and be configured to support multiple operating networks and communications protocols. In an aspect, modem 140 can control one or more components of UE 104 (e.g., RF front end 288, transceiver 202) to enable transmission and/or reception of signals from the network based on a specified modem configuration. In an aspect, the modem configuration can be based on the mode of the modem and the frequency band in use. In another aspect, the modem configuration can be based on UE configuration information associated with UE 104 as provided by the network during cell selection and/or cell reselection.

In an aspect, beam selecting component 142 can optionally include a beam reporting component 252 for reporting signal metrics of desirable beams or related reference signals, a beam communicating component 254 for beamforming communications for transmitting to one or more base stations 102, a beam failure detecting component 256 for detecting at least partial beam failure of a DL and/or UL beam, and/or a beam failure recovery component 258 for recovering from detected beam failure.

In an aspect, the processor(s) 212 may correspond to one or more of the processors described in connection with the UE in FIG. 8. Similarly, the memory 216 may correspond to the memory described in connection with the UE in FIG. 8.

Figure 3:
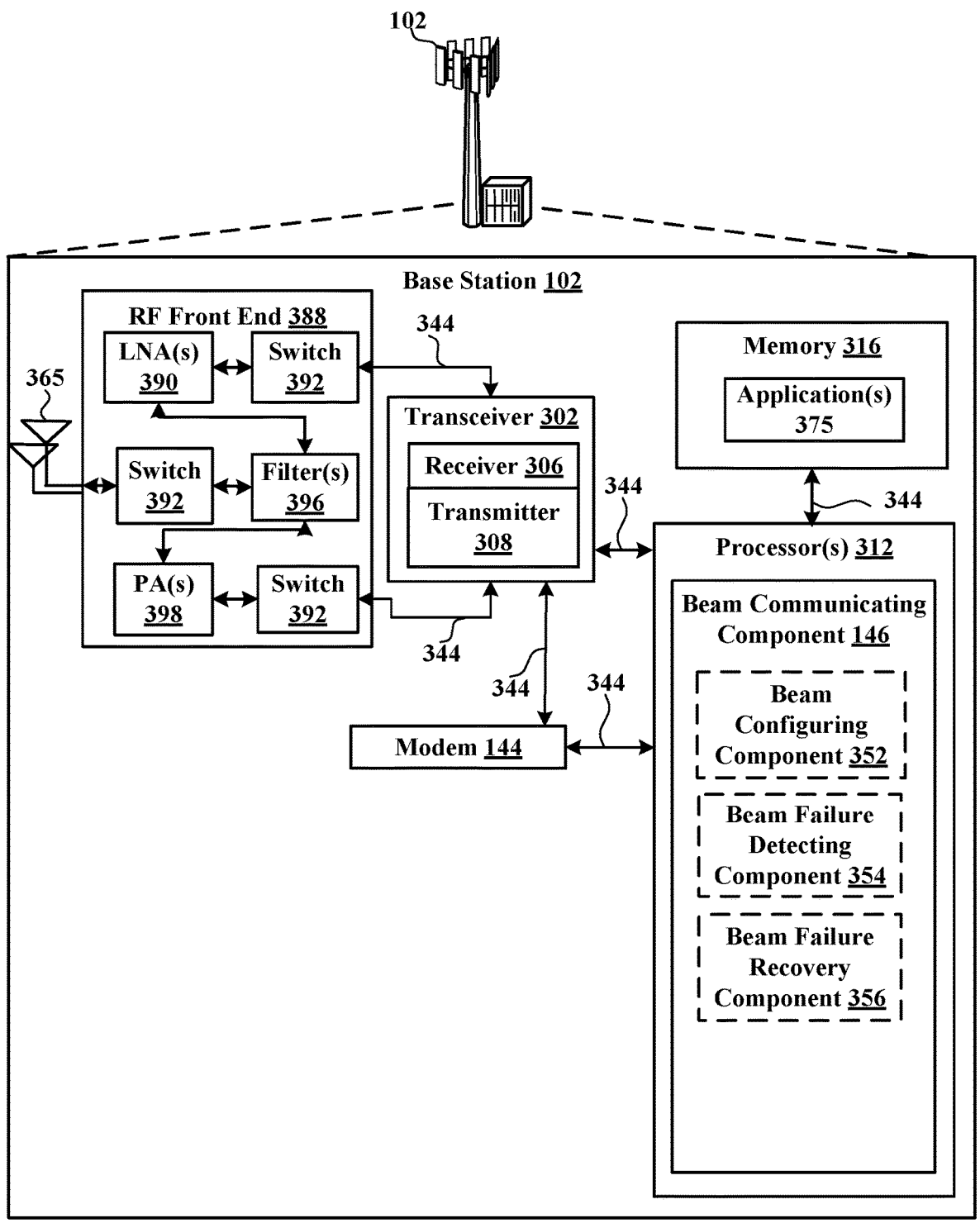
FIG. 3 is a block diagram illustrating an example of a base station, in accordance with various aspects of the present disclosure.

Referring to FIG. 3, one example of an implementation of base station 102 may include a variety of components, some of which have already been described above, but including components such as one or more processors 312 and memory 316 and transceiver 302 in communication via one or more buses 344, which may operate in conjunction with modem 144 and beam communicating component 146 for communicating with one or more UEs 104 based on one or more DL and/or UL beams.

The transceiver 302, receiver 306, transmitter 308, one or more processors 312, memory 316, applications 375, buses 344, RF front end 388, LNAs 390, switches 392, filters 396, PAs 398, and one or more antennas 365 may be the same as or similar to the corresponding components of UE 104, as described above, but configured or otherwise programmed for base station operations as opposed to UE operations.

In an aspect, beam communicating component 146 can optionally include a beam configuring component 352 for configuring one or more DL or UL beams for communicating with one or more UEs 104, a beam failure detecting component 354 for detecting at least partial beam failure of a DL and/or UL beam, and/or a beam failure recovery component 356 for recovering from detected beam failure.

In an aspect, the processor(s) 312 may correspond to one or more of the processors described in connection with the base station in FIG. 8. Similarly, the memory 316 may correspond to the memory described in connection with the base station in FIG. 8.

Figure 4:
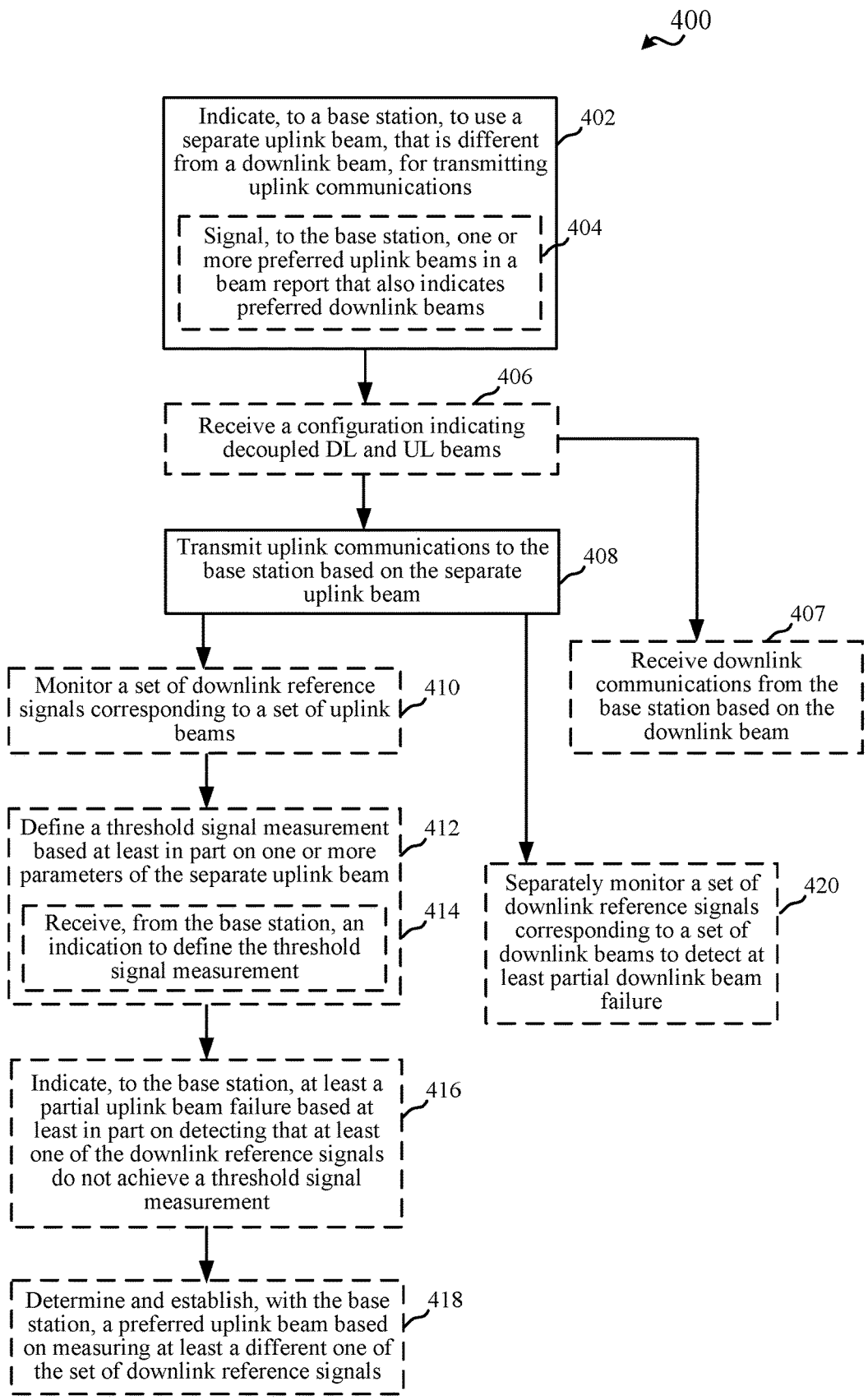
FIG. 4 is a flow chart illustrating an example of a method for reporting signal measurements related to both downlink and uplink beams, in accordance with various aspects of the present disclosure.

FIG. 4 illustrates a flow chart of an example of a method 400 for reporting signal measurements related to both DL and UL beams to facilitate decoupling the DL and UL beams. In an example, a UE 104 can perform the functions described in method 400 using one or more of the components described in FIGS. 1-2.

In method 400, at Block 402, it can be indicated, to a base station, to use a separate uplink beam that is different from a downlink beam. In an aspect, beam reporting component 252, e.g., in conjunction with processor(s) 212, memory 216, transceiver 202, beam selecting component 142, etc., can indicate, to the base station (e.g., base station 102), to use the separate uplink beam that is different from the downlink beam. In this regard, for example, the UE 104 can cause decoupling of the DL and UL beams for communicating with the base station 102. In one example, beam selecting component 142 can communicate an explicit indicator to the base station 102 to decouple DL and UL beams. In another example, beam selecting component 142 can separately report measurements for signals related to DL and UL beams. For example, interference on the device (e.g., related to impact of MPE) may cause different beams to be desirable in DL and UL directions, and thus decoupling the beams may provide more desirable operation. Indicating use of a separate UL beam in this regard can include the indication of the UE 104 using a separate UL beam when transmitting to the base station 102 and/or that the base station 102 is to use a separate UL beam in receiving communications from the UE 104.

For example, indicating to use a separate uplink beam at Block 402 can optionally include, at Block 404, signaling, to the base station, one or more preferred uplink beams in a beam report that also indicates preferred downlink beams or in a separate beam report. In an aspect, beam reporting component 252, e.g., in conjunction with processor(s) 212, memory 216, transceiver 202, beam selecting component 142, etc., can signal, to the base station 102, one or more preferred uplink beams in a beam report that also indicates preferred downlink beams. For example, base station 102 can transmit multiple reference signals in multiple beamformed directions, and beam reporting component 252 can receive the reference signals and report signal measurements (e.g., reference signal received power (RSRP), reference signal received quality (RSRQ), received signal strength indicator (RSSI), etc.) for the reference signals. In addition, beam reporting component 252 can specify whether the corresponding reference signals in the beam report are to be considered for DL or UL beams.

In one example, for one or more of the reference signals, the beam report may indicate whether each of the one or more reference signals are to be considered for either downlink beams or uplink beams. This can allow the base station 102 to decouple the DL and UL beams where, for example, the UE 104 reports separate DL and UL beam measurements, or at least where the beam report indicates one measurement to correspond to a desirable DL beam and a different measurement to correspond to a desirable UL beam. In another example, beam reporting component 252 can send the beam reports as a first list of measurements of beams to be considered for DL beam and a second list of measurements of beams to be considered for UL beam. In one example, the lists can be ordered in order of received signal strength/quality, in order of desirability determined by the UE 104 (e.g., based on factors other than or augmenting received signal strength/quality), etc. Moreover, in an example, beam reporting component 252 can generate the lists of measurements of beams that achieve a threshold strength/quality.

In method 400, optionally at Block 406, a configuration indicating decoupled DL and UL beams can be received. In an aspect, beam selecting component 142, e.g., in conjunction with processor(s) 212, memory 216, transceiver 202, etc., can receive the configuration (e.g., from base station 102) indicating the decoupled DL and UL beams. For example, the configuration can indicate one or more properties or identifiers associated with the beams, a beamforming matrix, and/or the like, to allow the UE 104 to identify and use the beams (e.g., to beamform antennas for receiving DL signals from the base station 102 and/or beamform antennas for transmitting UL signals to the base station 102, etc.). In an example, the configuration can be received over a control channel communication, in a higher layer communication (e.g., radio resource control (RRC) message), and/or the like.

In addition, in method 400, at Block 407, downlink communications can be received from the base station based on the downlink beam. In an aspect, beam communicating component 254, e.g., in conjunction with processor(s) 212, memory 216, transceiver 202, beam selecting component 142, etc., can receive the downlink communications from the base station (e.g., base station 102) based on the downlink beam. For example, beam communicating component 254 can beamform, based on the downlink beam, antennas 265 to receive the downlink communications.

In addition, in method 400, at Block 408, uplink communications can be transmitted to the base station based on the separate uplink beam. In an aspect, beam communicating component 254, e.g., in conjunction with processor(s) 212, memory 216, transceiver 202, beam selecting component 142, etc., can transmit the uplink communications to the base station (e.g., base station 102) based on the separate uplink beam. For example, beam communicating component 254 can beamform antennas 265 to transmit uplink communications based on the uplink beam, and UE 104 can receive communications from the base station 102 based on a separate downlink beam, as described above. For example, beam communicating component 254 may transmit uplink communication and receive downlink communications based on respective beams at similar or different times. As described, beamforming uplink communications can include beamforming antennas 265 (e.g., according to a beamforming matrix) to transmit uplink communications to the base station 102, and beamforming for downlink communications can include beamforming antennas 265 (e.g., according to a beamforming matrix) to receive downlink communications from the base station 102. Additionally, as described, in using different downlink and uplink beams, the UE 104 (and/or base station 102) can also separately detect beam failure for each of the downlink and uplink beams.

Detecting beam failure can be based on receiving and measuring reference signals corresponding to a beam. Thus, for example, in method 400, optionally at Block 410, a set of downlink reference signals corresponding to a set of uplink beams can be monitored. In an aspect, beam failure detecting component 256, e.g., in conjunction with processor(s) 212, memory 216, transceiver 202, beam selecting component 142, etc., can monitor the set of downlink reference signals corresponding to the set of uplink beams. In an example, the base station 102 may configure the set of downlink reference signals for the UL beam, and may indicate the set of downlink reference signals in the configuration received at Block 406. The set of downlink reference signals can be referred to as a recovery set where the UE 104 can measure the downlink reference signals in the set and report full beam failure when all reference signals in the recovery set fail to achieve a threshold signal measurement. For example, base station 102 can periodically transmit the downlink reference signals to allow the UE 104 to measure the reference signals and evaluate whether a current beam is desirable or should be changed. In addition, information regarding when the downlink reference signals are transmitted may also be indicated by the base station 102 (e.g., in the configuration in Block 406). In this regard, for example, beam failure detecting component 256 can monitor time/frequency resources configured for the reference signals in an attempt to detect the reference signals being transmitted by the base station 102. As described further herein, beam failure detecting component 256 can compare a signal strength/quality of the reference signal to a threshold to determine whether the reference signal achieves the threshold. If so, the beam is continued to be used. If not, beam failure may be detected, reported, and/or resolved, as described herein.

In an example, in method 400, optionally at Block 412, a threshold signal measurement can be defined based at least in part on one or more parameters of the separate uplink beam. In an aspect, beam failure detecting component 256, e.g., in conjunction with processor(s) 212, memory 216, transceiver 202, beam selecting component 142, etc., can define the threshold signal measurement based at least in part on the one or more parameters of the separate uplink beam. For example, beam failure detecting component 256 can define the threshold signal measurement, e.g., for signal measurements of the downlink reference signals for the UL beam to determine beam failure of the UL beam, as a function of UE 104 transmit beam parameters, as a function of measured RSRP, etc. Thus, the threshold signal measurement can be UE configured and/or UL beam specific, which can be advantageous as the out-of-service indication is not simply based on RSRP and as the MPE limitation can be implicitly captured.

In one example, the UE 104 can configure the threshold based on instruction from the base station 102. Thus, in an example, defining the threshold signal measurement at Block 412 can optionally include, at Block 414, receiving, from the base station, an indication to define the threshold signal measurement. In an aspect, beam failure detecting component 256, e.g., in conjunction with processor(s) 212, memory 216, transceiver 202, beam selecting component 142, etc., can receive, from the base station, an indication to define the threshold signal measurement. For example, the indication can be received in control data received over a control channel, in higher layer signaling (e.g., RRC message), and/or the like. The indication can include a one bit indicator to define the threshold signal measurement, information or values to use in computing the threshold signal measurement (e.g., parameters related to or otherwise measured by the UE), a value for one or more of the threshold signal measurements, and/or the like.

In an example, in method 400, optionally at Block 416, at least a partial uplink beam failure can be indicated, to the base station, based at least in part on detecting that at least one of the downlink reference signals do not achieve a threshold signal measurement. In an aspect, beam failure detecting component 256, e.g., in conjunction with processor(s) 212, memory 216, transceiver 202, beam selecting component 142, etc., can indicate, to the base station, at least the partial uplink beam failure based at least in part on detecting that at least one of the downlink reference signals do not achieve the threshold signal measurement. For example, beam failure detecting component 256 can use the threshold signal measurement computed or defined as described above. In other examples, however, beam failure detecting component 256 can use a different received or determined threshold signal measurement (e.g., as received from the base station 102, determined from a local or received configuration, and/or the like).

In an example, beam failure detecting component 256 can indicate the beam failure by indicating one of a set of reference signals associated with the uplink beam fail to achieve the threshold signal measurement. In another example, beam failure detecting component 256 can indicate the beam failure by indicating multiple or all of a set of reference signals associated with the uplink beam fail to achieve the threshold signal measurement. In another example, beam failure detecting component 256 can separately indicate one type of beam failure where one (or more) of the set of reference signals fail to achieve the threshold signal measurement and/or another type of beam failure where all of the set of reference signals fail to achieve the threshold signal measurement.

For example, beam failure detecting component 256 can detect beam failure where $P(b)-PLoss(b) < ConfigThreshold$, where $P(b)$ is an implicit MPE parameter and a max power permissible for a beam $b$, $PLoss(b)$ is the RSRP parameter, and ConfigThreshold is a function of gNB PUCCH Rx performance. In one example, $PLoss(b)=RefSigPwr-L1RSRP(b)$, where $L1RSRP(b)$ is the measured RSRP by beam $b$. In an example, beam failure detecting component 256 can detect one or more types of beam failure where the condition holds for one, multiple, or all defined reference signals for the beam, etc., as described above. As described further herein, uplink beam failure may additionally or alternatively be detected and/or recovered from by the base station 102. In addition, beam failure detecting component 256 can indicate whether the beam failure is for the uplink or downlink beam (e.g., whether the condition holds for the reference signal(s) for the uplink beam or separately whether the condition holds for the reference signal(s) of the downlink beam).

Additionally, optionally at Block 418, a preferred uplink beam can be determined and established with the base station based on measuring at least a different one of the set of downlink reference signals. In an aspect, beam failure recovery component 258, e.g., in conjunction with processor(s) 212, memory 216, transceiver 202, beam selecting component 142, etc., can determine and establish, with the base station (e.g., base station 102), the preferred uplink beam based on measuring at least a different one of the set of downlink reference signals. Thus, for example, beam failure recovery component 258 (e.g., based on detecting and indicating beam failure) can determine a desirable downlink reference signal for reporting to the base station to reestablish an uplink beam. As described above, for example, a configuration indicating the uplink beam and be received from the base station and/or the beam communicating component 254 can other utilize the new uplink beam in communicating with the base station 102. For example, establishing the different preferred uplink beam can include beamforming the antennas 265 based on the different preferred uplink beam (e.g., according to an associated beamforming matrix) in transmitting uplink communications to the base station 102. Similarly, establishing the different preferred uplink beam can include the base station 102 beamforming its antennas 365 based on the different preferred uplink beam (e.g., according to an associated beamforming matrix) for receiving uplink communications from the UE 104.

Moreover, as described, in method 400, optionally at Block 420, a set of downlink reference signals corresponding to a set of downlink beams can be separately monitored. In an aspect, beam failure detecting component 256, e.g., in conjunction with processor(s) 212, memory 216, transceiver 202, beam selecting component 142, etc., can separately monitor the set of downlink reference signals corresponding to a set of downlink beams (e.g., separately from monitoring the downlink reference signals corresponding to the uplink beams) to detect at least partial downlink beam failure. Thus, as the downlink and uplink beams are decoupled, beam failure can be separately detected and/or recovered from for the downlink and uplink beams. For example, when beam failure is detected, beam failure detecting component 256 can indicate whether the failure is related to the downlink or uplink beam and/or can provide an indication of preferred downlink or uplink beams, as described above.

Figure 5:
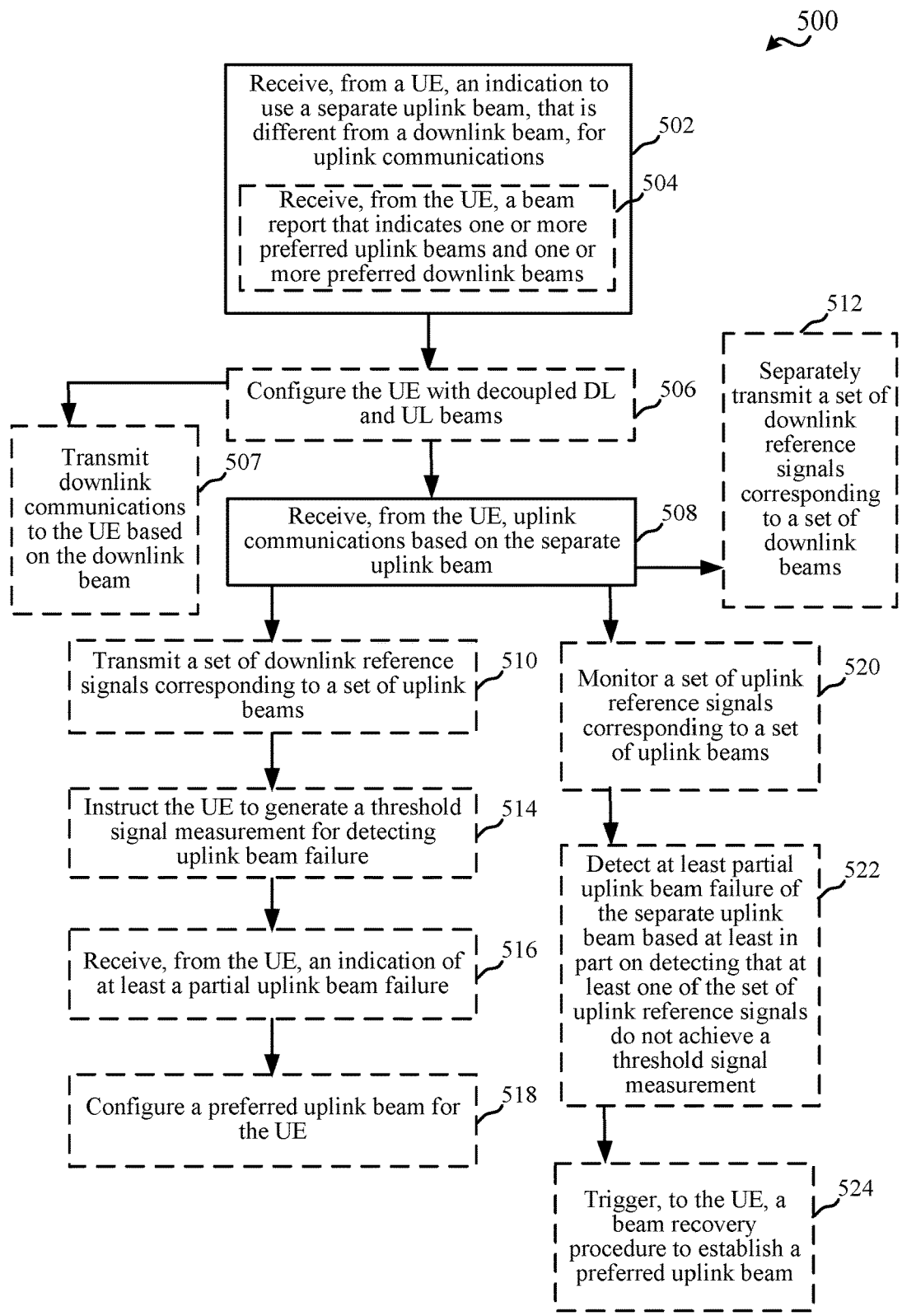
FIG. 5 is a flow chart illustrating an example of a method for decoupling downlink and uplink beams, in accordance with various aspects of the present disclosure.

FIG. 5 illustrates a flow chart an example of a method 500 for receiving an indication to decouple downlink and uplink beams. In an example, a base station 102 can perform the functions described in method 500 using one or more of the components described in FIGS. 1 and 3.

In method 500, at Block 502, an indication can be received to use a separate uplink beam, that is different from a downlink beam, for uplink communications. In an aspect, beam configuring component 352, e.g., in conjunction with processor(s) 312, memory 316, transceiver 302, beam communicating component 146, etc., can receive the indication to use the separate uplink beam, that is different from the downlink beam, for uplink communications. For example, this can cause decoupling of the DL and UL beams for communicating with the UE 104. In one example, the indication can include an explicit indicator to decouple DL and UL beams (e.g., the DL beams associated with transmitting downlink communications and the UL beams associated with receiving uplink communications). In another example, the indication can include separately reported measurements for signals related to DL and UL beams. For example, interference on a device (e.g., related to impact of MPE) may cause different beams to be desirable in DL and UL directions, and thus decoupling the DL and UL beams may provide more desirable operation for DL and UL communications.

In an example, receiving the indication at Block 502 may optionally include, at Block 504, receiving, from the UE, a beam report that indicates one or more preferred uplink beams and one or more preferred downlink beams. In an aspect, beam configuring component 352, e.g., in conjunction with processor(s) 312, memory 316, transceiver 302, beam communicating component 146, etc., can receive, from the UE (e.g., UE 104), the beam report that indicates one or more preferred uplink beams and one or more preferred downlink beams. For example, the beam report can include a list of reference signal measurements and can indicate whether a given measurement is for an uplink beam or not (or for a downlink beam). Where the beam report indicates a first reference signal measurement for one beam and a second reference signal measurement for an uplink beam (e.g., that is higher than the first measurement), the base station 102 can configure a separate beam for uplink communications (e.g., a beam corresponding to the second reference signal). In other examples, as described the list of reference signal measurements may include separate lists for DL and UL beam consideration, etc.

In method 500, optionally at Block 506, the UE can be configured with decoupled downlink and uplink beams. In an aspect, beam configuring component 352, e.g., in conjunction with processor(s) 312, memory 316, transceiver 302, beam communicating component 146, etc., can configure the UE with the decoupled downlink and uplink beams. In the above example, beam configuring component 352 can configure the downlink beam based on the first reference signal and the uplink beam based on the second reference signal, in the above example. Beam configuring component 352 can indicate the configuration to the UE 104 (e.g., in control data over a control channel, in a higher layer message such as an RRC message, etc.). Moreover, the configuration can indicate the uplink and/or downlink beams by at least one of indicating a corresponding beam index from which beam properties (e.g., beamforming matrix) can be determined, indicating the beam properties, indicating that the UE 104 can use a beam corresponding to a reported reference signal measurement, etc. In any case, the UE 104 can use the uplink beam to beamform uplink communications, as described.

In method 500, at Block 507, downlink communications can be transmitted to the UE based on the downlink beam. In an aspect, beam communicating component 146, e.g., in conjunction with processor(s) 312, memory 316, transceiver 302, etc., can transmit the downlink communications to the UE (e.g., UE 104) based on the downlink beam. For example, UE 104 can beamform antennas 365 for downlink communications based on the downlink beam, which can include beamforming downlink control channel communications, downlink shared channel communications, and/or the like.

In method 500, at Block 508, uplink communications based on the separate uplink beam can be received from the UE. In an aspect, beam communicating component 146, e.g., in conjunction with processor(s) 312, memory 316, transceiver 302, etc., can receive, from the UE (e.g., UE 104), uplink communications based on the separate uplink beam. For example, UE 104 can beamform uplink communications based on the uplink beam, which can include beamforming uplink control channel communications, uplink shared channel communications, and/or the like. Base station 102 can transmit downlink communications using another downlink beam, as described. Additionally, as described, where the downlink and uplink beams are decoupled, beam failure for the beams can also be separately detected and/or separately recovered.

In method 500, optionally at Block 510, a set of downlink reference signals corresponding to a set of uplink beams can be transmitted. In an aspect, beam communicating component 146, e.g., in conjunction with processor(s) 312, memory 316, transceiver 302, etc., can transmit the set of downlink reference signals corresponding to the set of uplink beams. For example, when the uplink beam is configured, a set of downlink reference signals corresponding to the uplink beam can be determined, which can include downlink reference signals transmitted as beams in a similar direction. In an example, the downlink reference signals can be indicated to the UE 104 (e.g., in the configuring of Block 506). As described, the UE 104 can receive and analyze these reference signals to determine radio conditions for the uplink beam. As the beams are decoupled, the base station 102 can separately transmit corresponding reference signals for both the DL beam and the UL beam, which can facilitate separate determination of beam failure.

Thus, in method 500, optionally at Block 512, a set of downlink reference signals corresponding to a set of downlink beams can be separately transmitted. In an aspect, beam communicating component 146, e.g., in conjunction with processor(s) 312, memory 316, transceiver 302, etc., can separately transmit the set of downlink reference signals corresponding to the set of downlink beams. This can allow the UE 104 to separately analyze the downlink reference signals for the downlink beam to separately detect beam failure at the uplink beam or downlink beam. As described, in one example, this can include detecting partial beam failure where one or more of the set of reference signals (for the uplink or downlink beam) fail to achieve a threshold signal measurement, full beam failure where all of the set of reference signals (for the uplink or downlink beam) fail to achieve a threshold signal measurement, etc.

In method 500, optionally at Block 514, the UE can be instructed to generate a threshold signal measurement for detecting uplink beam failure. In an aspect, beam failure detecting component 354, e.g., in conjunction with processor(s) 312, memory 316, transceiver 302, beam communicating component 146, etc., can instruct the UE (e.g., UE 104) to generate the threshold signal measurement for detecting the uplink beam failure. As described, for example, this may include providing the UE with instructions, values, etc. for computing the threshold signal measurement, which may be accordingly computed by the UE and/or based on the UE uplink beam.

In method 500, optionally at Block 516, an indication of at least a partial uplink beam failure can be received from the UE. In an aspect, beam failure detecting component 354, e.g., in conjunction with processor(s) 312, memory 316, transceiver 302, beam communicating component 146, etc., can receive, from the UE (e.g., UE 104), the indication of at least the partial uplink beam failure. For example, beam failure detecting component 354 can receive the indication in control data communicated over a control channel from the UE 104, in higher layer signaling, etc., which may be based on the UE determining that one or more (or all) of the reference signals associated with the beam failed to achieve threshold signal measurement(s). Moreover, as described, the indication can include a preferred uplink beam determined by the UE 104 (e.g., based on measuring other downlink reference signals) to use in place of the beam for which beam failure is detected. In addition, the indication can indicate that the beam failure is related to the uplink beam (and in other examples can indicate when the beam failure is related to the downlink beam).

In method 500, optionally at Block 518, a preferred uplink beam for the UE can be configured. In an aspect, beam failure recovery component 356, e.g., in conjunction with processor(s) 312, memory 316, transceiver 302, beam communicating component 146, etc., can configure the preferred uplink beam for the UE. For example, as described, beam failure recovery component 356 can indicate the configuration to the UE 104 (e.g., in control data over a control channel, in a higher layer message such as RRC, etc.). Moreover, the configuration can indicate the uplink and/or downlink beams by indicating a corresponding beam index from which beam properties (e.g., beamforming matrix) can be determined, indicating the beam properties, indicating that the UE 104 can use a beam corresponding to a reported reference signal measurement, etc. In any case, the UE 104 can use the preferred uplink beam to beamform uplink communications, as described. Moreover, configuring the preferred uplink beam can also include base station 102 using the preferred uplink beam to beamform antennas 365 to receive uplink communications from the UE 104.

In another example, the base station 102 can detect beam failure. In this example, in method 500, optionally at Block 520, a set of uplink reference signals corresponding to a set of uplink beams can be monitored. In an aspect, beam failure detecting component 354, e.g., in conjunction with processor(s) 312, memory 316, transceiver 302, beam communicating component 146, etc., can monitor the set of uplink reference signals corresponding to the set of uplink beams. As described, for example, the UE 104 can transmit uplink reference signals that are beamformed corresponding to the uplink beams to allow the base station 102 to analyze the reference signal to detect partial or full beam failure (e.g., where less than all or all reference signals in a set of reference signals corresponding to the uplink beams fail to achieve a threshold signal measurement).

In this example, in method 500, optionally at Block 522, at least partial uplink beam failure of the separate uplink beam can be detected based on detecting that at least one of the set of uplink reference signals do not achieve a threshold signal measurement. In an aspect, beam failure detecting component 354, e.g., in conjunction with processor(s) 312, memory 316, transceiver 302, beam communicating component 146, etc., can detect at least the partial uplink beam failure of the separate uplink beam based at least in part on detecting that at least one of the set of uplink reference signals does not achieve the threshold signal measurement. For example, beam failure detecting component 354 can detect partial beam failure based on detecting that one or more of the reference signals fail to achieve the threshold signal measurement, and/or can detect full beam failure based on detecting that all reference signals associated with the uplink beam fail to achieve the threshold signal measurement.

In this example, in method 500, optionally at Block 524, a beam recovery procedure can be triggered, to the UE, to establish a preferred uplink beam. In an aspect, beam failure recovery component 356, e.g., in conjunction with processor(s) 312, memory 316, transceiver 302, beam communicating component 146, etc., can trigger, to the UE (e.g., UE 104), the beam recovery procedure to establish a preferred uplink beam. For example, based on detecting the beam failure of the uplink beam, beam failure recovery component 356 can trigger a random access channel (RACH) procedure, sounding reference signal (SRS) procedure, etc. to the UE 104, such that the UE 104 can perform the RACH and/or SRS procedure to recover the uplink beam. In one example, the UE 104 can continue to monitor for downlink beam failures in this example.

Figure 6:
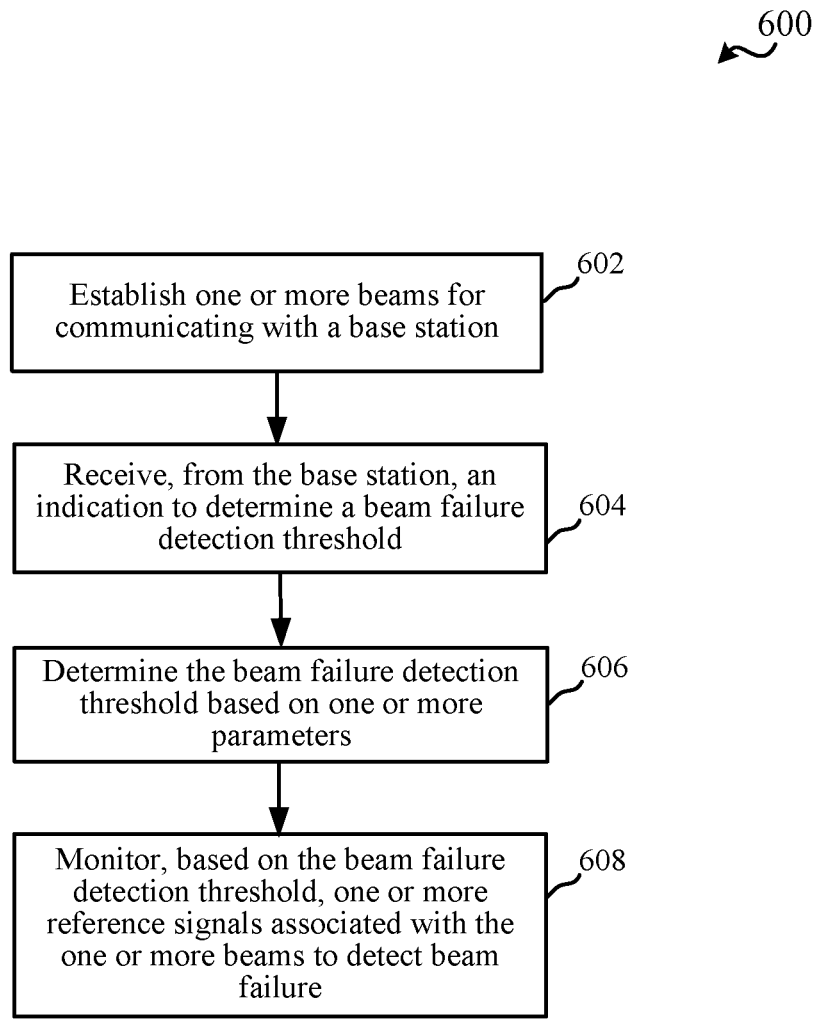
FIG. 6 is a flow chart illustrating an example of a method for detecting beam failure, in accordance with various aspects of the present disclosure.

FIG. 6 illustrates a flow chart of an example of a method 600 for detecting beam failure. In an example, a UE 104 can perform the functions described in method 600 using one or more of the components described in FIGS. 1-2.

In method 600, at Block 602, one or more beams can be established for communicating with a base station. In an aspect, beam communicating component 254, e.g., in conjunction with processor(s) 212, memory 216, transceiver 202, beam selecting component 142, etc., can establish the one or more beams for communicating with the base station (e.g., base station 102). As described, for example, this can include indicating one or more preferred beams or related reference signal measurements to the base station 102 and/or receiving a corresponding beam configuration from the base station 102.

In method 600, at Block 604, an indication can be received, from the base station, to determine a beam failure detection threshold. In an aspect, beam failure detecting component 256, e.g., in conjunction with processor(s) 212, memory 216, transceiver 202, beam selecting component 142, etc., can receive, from the base station (e.g., base station 102) to determine the beam failure detection threshold (e.g., the threshold signal measurement described above). As described, the indication can be received in control data received over a control channel, in higher layer signaling (e.g., RRC message), and/or the like, and/or may be received as part of the beam configuration. The indication can include a one bit indicator, information or values to use in computing the threshold signal measurement, and/or the like.

In method 600, at Block 606, the beam failure detection threshold can be determined based on one or more parameters. In an aspect, beam failure detecting component 256, e.g., in conjunction with processor(s) 212, memory 216, transceiver 202, beam selecting component 142, etc., can determine the beam failure detection threshold based on the one or more parameters, which can be based on the received indication as well. For example, beam failure detecting component 256 can determine the threshold based on the UE transmit beam parameters, measured RSRP, etc. In an example, beam failure detecting component 256 can include logic or instructions for computing the threshold based on the UE transmit beam parameters, measured RSRP, etc. (e.g., mapping the UE transmit beam parameters, measured RSRP, etc. to threshold values, and/or the like).

In method 600, at Block 608, one or more reference signals associated with the one or more beams can be monitored, based on the beam failure detection threshold, to detect beam failure. In an aspect, beam failure detecting component 256, e.g., in conjunction with processor(s) 212, memory 216, transceiver 202, beam selecting component 142, etc., can monitor, based on the beam failure detection threshold, the one or more reference signals associated with the one or more beams to detect the beam failure. As described, for example, beam failure detecting component 256 can detect the beam failure where P(b)−PLoss(b)<ConfigThreshold. Where beam failure is detected, as described, beam failure recovery component 258 can attempt to recover from the beam failure (e.g., by indicating the beam failure and/or a preferred uplink beam to the base station 102), as described.

Figure 7:
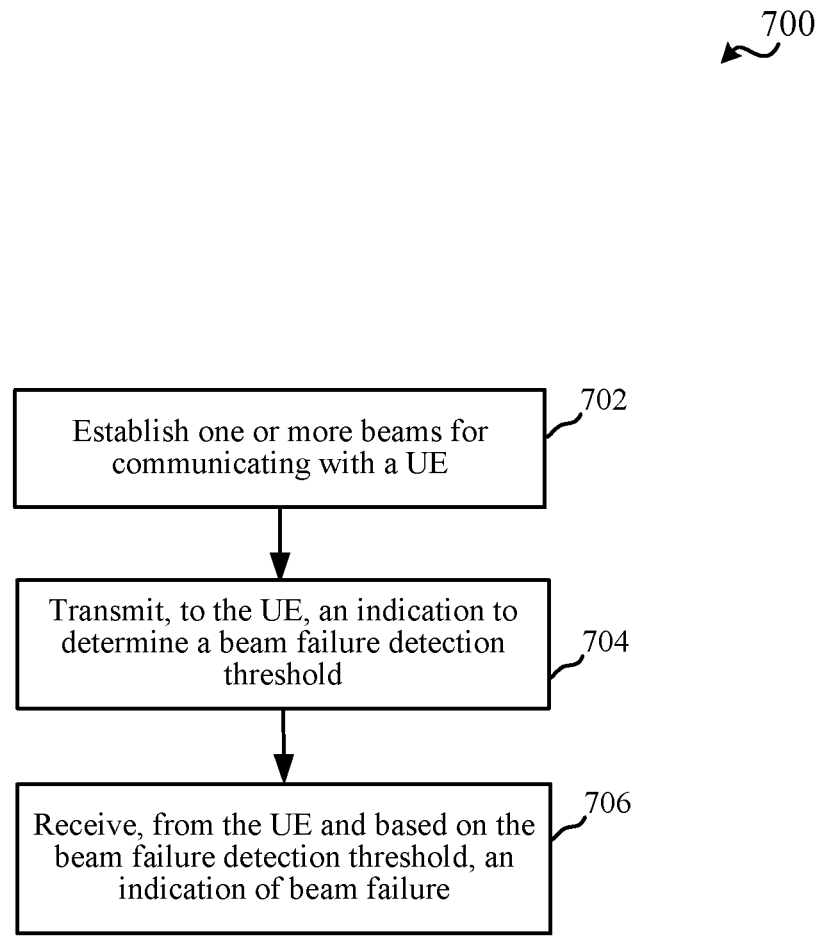
FIG. 7 is a flow chart illustrating an example of a method for instructing to determine a beam failure detection threshold, in accordance with various aspects of the present disclosure.

FIG. 7 illustrates a flow chart an example of a method 700 for instructing a UE to determine a beam failure detection threshold. In an example, a base station 102 can perform the functions described in method 700 using one or more of the components described in FIGS. 1 and 3.

In method 700, at Block 702, one or more beams can be established for communicating with a UE. In an aspect, beam configuring component 352, e.g., in conjunction with processor(s) 312, memory 316, transceiver 302, beam communicating component 146, etc., can establish one or more beams for communicating with the UE (e.g., UE 104). For example, as described, beam configuring component 352 can establish DL and/or UL beams based on signal measurements in a beam report received from the UE 104.

In method 700, at Block 704, an indication to determine a beam failure detection threshold can be transmitted to the UE. In an aspect, beam failure detecting component 354, e.g., in conjunction with processor(s) 312, memory 316, transceiver 302, beam communicating component 146, etc., can transmit, to the UE (e.g., UE 104), the indication to determine the beam failure detection threshold. As described, the indication can be transmitted in control data over a control channel, in higher layer signaling (e.g., RRC message), and/or the like. The indication can include a one bit indicator, information or values to use in computing the threshold signal measurement, and/or the like.

In method 700, at Block 706, an indication of beam failure can be received from the UE based on the beam failure detection threshold. In an aspect, beam failure detecting component 354, e.g., in conjunction with processor(s) 312, memory 316, transceiver 302, beam communicating component 146, etc., can receive, from the UE and based on the beam failure detection threshold, the indication of beam failure. For example, beam failure detecting component 354 can receive the indication from the UE 104 in a control channel communication, higher layer signaling, etc., as described. Based on the indication, base station 102 can configure a preferred uplink beam for the UE 104, as described.

Figure 8:
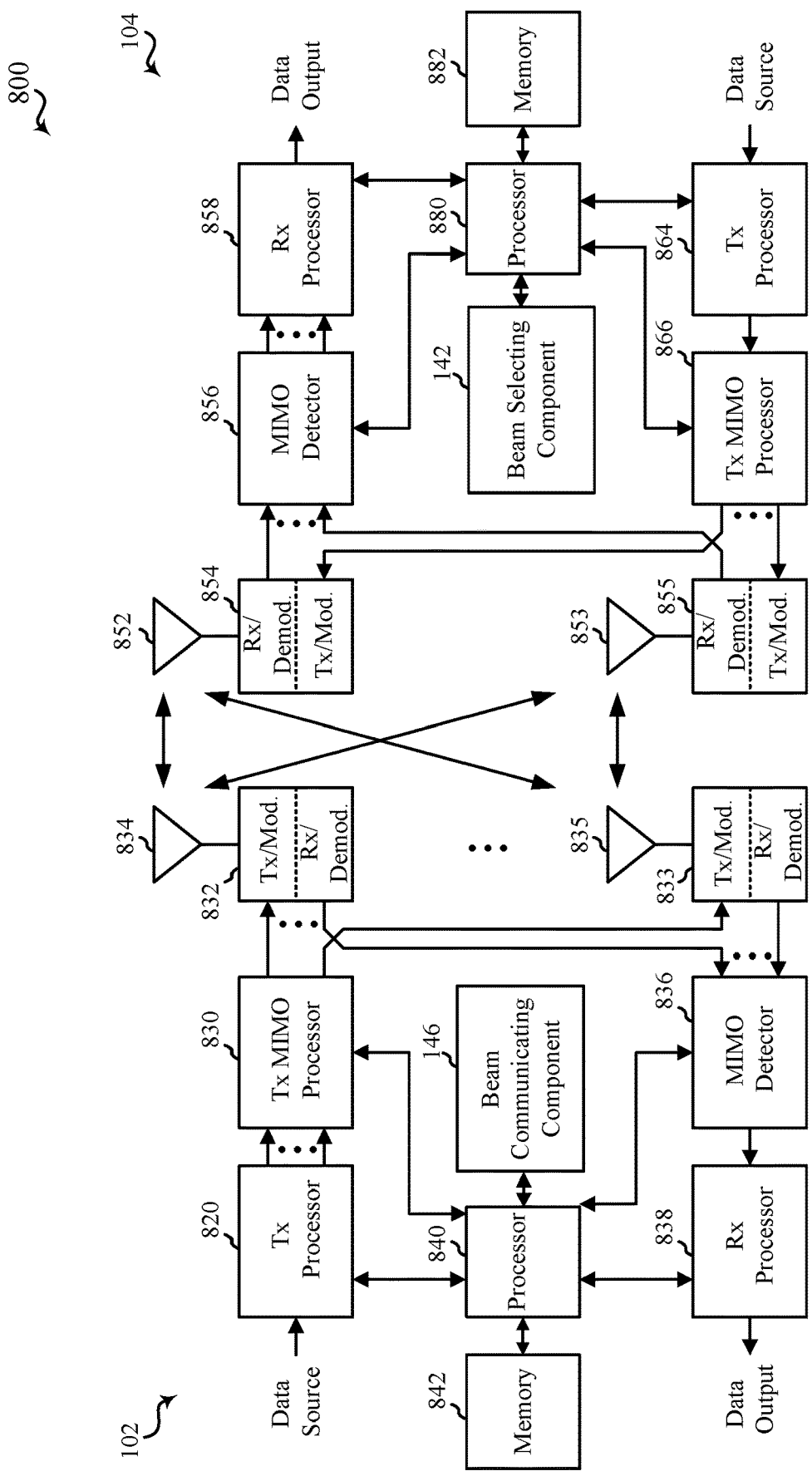
FIG. 8 is a block diagram illustrating an example of a MIMO communication system including a base station and a UE, in accordance with various aspects of the present disclosure.

FIG. 8 is a block diagram of a MIMO communication system 800 including a base station 102 and a UE 104. The MIMO communication system 800 may illustrate aspects of the wireless communication access network 100 described with reference to FIG. 1. The base station 102 may be an example of aspects of the base station 102 described with reference to FIG. 1. The base station 102 may be equipped with antennas 834 and 835, and the UE 104 may be equipped with antennas 852 and 853. In the MIMO communication system 800, the base station 102 may be able to send data over multiple communication links at the same time. Each communication link may be called a "layer" and the "rank" of the communication link may indicate the number of layers used for communication. For example, in a 2×2 MIMO communication system where base station 102 transmits two "layers," the rank of the communication link between the base station 102 and the UE 104 is two.

At the base station 102, a transmit (Tx) processor 820 may receive data from a data source. The transmit processor 820 may process the data. The transmit processor 820 may also generate control symbols or reference symbols. A transmit MIMO processor 830 may perform spatial processing (e.g., precoding) on data symbols, control symbols, or reference symbols, if applicable, and may provide output symbol streams to the transmit modulator/demodulators 832 and 833. Each modulator/demodulator 832 through 833 may process a respective output symbol stream (e.g., for OFDM, etc.) to obtain an output sample stream. Each modulator/demodulator 832 through 833 may further process (e.g., convert to analog, amplify, filter, and upconvert) the output sample stream to obtain a DL signal. In one example, DL signals from modulator/demodulators 832 and 833 may be transmitted via the antennas 834 and 835, respectively.

The UE 104 may be an example of aspects of the UEs 104 described with reference to FIGS. 1-2. At the UE 104, the UE antennas 852 and 853 may receive the DL signals from the base station 102 and may provide the received signals to the modulator/demodulators 854 and 855, respectively. Each modulator/demodulator 854 through 855 may condition (e.g., filter, amplify, downconvert, and digitize) a respective received signal to obtain input samples. Each modulator/demodulator 854 through 855 may further process the input samples (e.g., for OFDM, etc.) to obtain received symbols. A MIMO detector 856 may obtain received symbols from the modulator/demodulators 854 and 855, perform MIMO detection on the received symbols, if applicable, and provide detected symbols. A receive (Rx) processor 858 may process (e.g., demodulate, deinterleave, and decode) the detected symbols, providing decoded data for the UE 104 to a data output, and provide decoded control information to a processor 880, or memory 882.

The processor 880 may in some cases execute stored instructions to instantiate a beam selecting component 142 (see e.g., FIGS. 1 and 2).

On the uplink (UL), at the UE 104, a transmit processor 864 may receive and process data from a data source. The transmit processor 864 may also generate reference symbols for a reference signal. The symbols from the transmit processor 864 may be precoded by a transmit MIMO processor 866 if applicable, further processed by the modulator/demodulators 854 and 855 (e.g., for SC-FDMA, etc.), and be transmitted to the base station 102 in accordance with the communication parameters received from the base station 102. At the base station 102, the UL signals from the UE 104 may be received by the antennas 834 and 835, processed by the modulator/demodulators 832 and 833, detected by a MIMO detector 836 if applicable, and further processed by a receive processor 838. The receive processor 838 may provide decoded data to a data output and to the processor 840 or memory 842.

The processor 840 may in some cases execute stored instructions to instantiate a beam communicating component 146 (see e.g., FIGS. 1 and 3).

The components of the UE 104 may, individually or collectively, be implemented with one or more ASICs adapted to perform some or all of the applicable functions in hardware. Each of the noted modules may be a means for performing one or more functions related to operation of the MIMO communication system 800. Similarly, the components of the base station 102 may, individually or collectively, be implemented with one or more ASICs adapted to perform some or all of the applicable functions in hardware. Each of the noted components may be a means for performing one or more functions related to operation of the MIMO communication system 800.

The above detailed description set forth above in connection with the appended drawings describes examples and does not represent the only examples that may be implemented or that are within the scope of the claims. The term "example," when used in this description, means "serving as an example, instance, or illustration," and not "preferred" or "advantageous over other examples." The detailed description includes specific details for the purpose of providing an understanding of the described techniques. These techniques, however, may be practiced without these specific details. In some instances, well-known structures and apparatuses are shown in block diagram form in order to avoid obscuring the concepts of the described examples.

Information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, computer-executable code or instructions stored on a computer-readable medium, or any combination thereof.

The various illustrative blocks and components described in connection with the disclosure herein may be implemented or performed with a specially-programmed device, such as but not limited to a processor, a digital signal processor (DSP), an ASIC, a FPGA or other programmable logic device, a discrete gate or transistor logic, a discrete hardware component, or any combination thereof designed to perform the functions described herein. A specially-programmed processor may be a microprocessor, but in the alternative, the processor may be any conventional processor, controller, microcontroller, or state machine. A specially-programmed processor may also be implemented as a combination of computing devices, e.g., a combination of a DSP and a microprocessor, multiple microprocessors, one or more microprocessors in conjunction with a DSP core, or any other such configuration.

The functions described herein may be implemented in hardware, software executed by a processor, firmware, or any combination thereof. If implemented in software executed by a processor, the functions may be stored on or transmitted over as one or more instructions or code on a non-transitory computer-readable medium. Other examples and implementations are within the scope and spirit of the disclosure and appended claims. For example, due to the nature of software, functions described above can be implemented using software executed by a specially programmed processor, hardware, firmware, hardwiring, or combinations of any of these. Features implementing functions may also be physically located at various positions, including being distributed such that portions of functions are implemented at different physical locations. Also, as used herein, including in the claims, "or" as used in a list of items prefaced by "at least one of" indicates a disjunctive list such that, for example, a list of "at least one of A, B, or C" means A or B or C or AB or AC or BC or ABC (i.e., A and B and C).

Computer-readable media includes both computer storage media and communication media including any medium that facilitates transfer of a computer program from one place to another. A storage medium may be any available medium that can be accessed by a general purpose or special purpose computer. By way of example, and not limitation, computer-readable media can comprise RAM, ROM, EEPROM, CD-ROM or other optical disk storage, magnetic disk storage or other magnetic storage devices, or any other medium that can be used to carry or store desired program code means in the form of instructions or data structures and that can be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, include compact disc (CD), laser disc, optical disc, digital versatile disc (DVD), floppy disk and Blu-ray disc where disks usually reproduce data magnetically, while discs reproduce data optically with lasers. Combinations of the above are also included within the scope of computer-readable media.

The previous description of the disclosure is provided to enable a person skilled in the art to make or use the disclosure. Various modifications to the disclosure will be readily apparent to those skilled in the art, and the common principles defined herein may be applied to other variations without departing from the spirit or scope of the disclosure. Furthermore, although elements of the described aspects and/or embodiments may be described or claimed in the singular, the plural is contemplated unless limitation to the singular is explicitly stated. Additionally, all or a portion of any aspect and/or embodiment may be utilized with all or a portion of any other aspect and/or embodiment, unless stated otherwise. Thus, the disclosure is not to be limited to the examples and designs described herein but is to be accorded the widest scope consistent with the principles and novel features disclosed herein.

What is claimed is:

1. A method for wireless communication, comprising:
    monitoring a set of downlink reference signals corresponding to a set of uplink beams, wherein the set of uplink beams includes at least a separate uplink beam that is different from a downlink beam;
    indicating, to a base station, at least a partial uplink beam failure based at least in part on detecting that at least one of the set of downlink reference signals does not achieve a threshold signal measurement, wherein the threshold signal measurement is defined based at least in part on one or more parameters of the separate uplink beam;
    indicating, to the base station, to use the separate uplink beam in transmitting uplink communications; and
    transmitting the uplink communications to the base station based on the separate uplink beam.

2. The method of claim 1, wherein the indicating to use the separate uplink beam comprises signaling, to the base station, one or more preferred uplink beams in a beam report.

3. The method of claim 2, further comprising indicating, in the beam report, one or more preferred downlink beams.

4. The method of claim 1, further comprising:
    determining a preferred uplink beam based on measuring at least a different one of the set of downlink reference signals;
    indicating, to the base station, the preferred uplink beam; and
    transmitting, to the base station, a subsequent uplink communication based on the preferred uplink beam.

5. The method of claim 1, further comprising separately monitoring a second set of downlink reference signals corresponding to a set of downlink beams.

6. The method of claim 1, wherein the threshold signal measurement is defined based at least in part on receiving, from the base station, an indication to define the threshold signal measurement.

7. The method of claim 1, wherein indicating at least the partial uplink beam failure comprises indicating full uplink beam failure based at least in part on detecting that all of the set of downlink reference signals do not achieve the threshold signal measurement.

8. The method of claim 1, further comprising receiving downlink communications from the base station based on the downlink beam.

9. An apparatus for wireless communication, comprising:
    a transceiver;
    a memory configured to store instructions; and
    one or more processors communicatively coupled with the transceiver and the memory, wherein the one or more processors are configured to:
        monitor a set of downlink reference signals corresponding to a set of uplink beams, wherein the set of uplink beams includes at least a separate uplink beam that is different from a downlink beam;
        indicate, to a base station, at least a partial uplink beam failure based at least in part on detecting that at least one of the set of downlink reference signals does not achieve a threshold signal measurement, wherein the threshold signal measurement is defined based at least in part on one or more parameters of the separate uplink beam;
        indicate, to the base station, to use the separate uplink beam in transmitting uplink communications; and
        transmit the uplink communications to the base station based on the separate uplink beam.

10. The apparatus of claim 9, wherein the one or more processors are configured to indicate to use the separate uplink beam at least in part by signaling, to the base station, one or more preferred uplink beams in a beam report.

11. The apparatus of claim 10, wherein the one or more processors are configured to indicate, in the beam report, one or more preferred downlink beams.

12. The apparatus of claim 9, wherein the one or more processors are configured to:
    determine a preferred uplink beam based on measuring at least a different one of the set of downlink reference signals;
    indicate, to the base station, the preferred uplink beam; and
    transmit, to the base station, a subsequent uplink communication based on the preferred uplink beam.

13. The apparatus of claim 9, wherein the one or more processors are further configured to separately monitor a second set of downlink reference signals corresponding to a set of downlink beams.

14. The apparatus of claim 9, wherein the threshold signal measurement is defined based at least in part on receiving, from the base station, an indication to define the threshold signal measurement.

15. The apparatus of claim 9, wherein the one or more processors are configured to indicate at least the partial uplink beam failure at least in part by indicating full uplink beam failure where the one or more processors detect that all of the set of downlink reference signals do not achieve the threshold signal measurement.

16. The apparatus of claim 9, wherein the one or more processors are further configured to receive downlink communications from the base station based on the downlink beam.

17. An apparatus for wireless communication, comprising:
    means for monitoring a set of downlink reference signals corresponding to a set of uplink beams, wherein the set of uplink beams includes at least a separate uplink beam that is different from a downlink beam;
    means for indicating, to a base station, at least a partial uplink beam failure based at least in part on detecting that at least one of the set of downlink reference signals does not achieve a threshold signal measurement, wherein the threshold signal measurement is defined based at least in part on one or more parameters of the separate uplink beam;

means for indicating, to the base station, to use the separate uplink beam in transmitting uplink communications; and means for transmitting the uplink communications to the base station based on the separate uplink beam.

18. The apparatus of claim 17, wherein the means for indicating to use the separate uplink beam signals, to the base station, one or more preferred uplink beams in a beam report.

19. The apparatus of claim 17, further comprising:
means for determining a preferred uplink beam based on measuring at least a different one of the set of downlink reference signals;
means for indicating, to the base station, the preferred uplink beam; and
means for transmitting, to the base station, a subsequent uplink communication based on the preferred uplink beam.

20. The apparatus of claim 17, further comprising means for separately monitoring a second set of downlink reference signals corresponding to a set of downlink beams.

21. The apparatus of claim 17, wherein the threshold signal measurement is defined based at least in part on receiving, from the base station, an indication to define the threshold signal measurement.

22. The apparatus of claim 17, wherein the means for indicating at least the partial uplink beam failure indicates full uplink beam failure based at least in part on detecting that all of the set of downlink reference signals do not achieve the threshold signal measurement.

23. The apparatus of claim 17, further comprising means for receiving downlink communications from the base station based on the downlink beam.

24. A non-transitory computer-readable medium, comprising code executable by one or more processors for wireless communications, the code comprising code for:
monitoring a set of downlink reference signals corresponding to a set of uplink beams, wherein the set of uplink beams includes at least a separate uplink beam that is different from a downlink beam;
indicating, to a base station, at least a partial uplink beam failure based at least in part on detecting that at least one of the set of downlink reference signals does not achieve a threshold signal measurement, wherein the threshold signal measurement is defined based at least in part on one or more parameters of the separate uplink beam;
indicating, to the base station, to use the separate uplink beam in transmitting uplink communications; and
transmitting the uplink communications to the base station based on the separate uplink beam.

25. The non-transitory computer-readable medium of claim 24, wherein the code for indicating to use the separate uplink beam signals, to the base station, one or more preferred uplink beams in a beam report.

26. The non-transitory computer-readable medium of claim 24, further comprising:
code for determining a preferred uplink beam based on measuring at least a different one of the set of downlink reference signals;
code for indicating, to the base station, the preferred uplink beam; and
code for transmitting, to the base station, a subsequent uplink communication based on the preferred uplink beam.

27. The non-transitory computer-readable medium of claim 24, further comprising code for separately monitoring a second set of downlink reference signals corresponding to a set of downlink beams.

28. The non-transitory computer-readable medium of claim 24, wherein the threshold signal measurement is defined based at least in part on receiving, from the base station, an indication to define the threshold signal measurement.

29. The non-transitory computer-readable medium of claim 24, wherein the code for indicating at least the partial uplink beam failure indicates full uplink beam failure based at least in part on detecting that all of the set of downlink reference signals do not achieve the threshold signal measurement.

30. The non-transitory computer-readable medium of claim 24, further comprising code for receiving downlink communications from the base station based on the downlink beam.

* * * * *